United States Patent [19]

Jarvis

[11] 4,110,012
[45] Aug. 29, 1978

[54] REAR VIEW MIRROR SYSTEM WITH ELLIPTICALLY CURVED MIRROR AND FLAT MIRROR

[76] Inventor: Kenneth W. Jarvis, 5900 Columbus Ave. South, Minneapolis, Minn. 55417

[21] Appl. No.: 823,718

[22] Filed: Aug. 11, 1977

[51] Int. Cl.² .............................................. G02B 5/08
[52] U.S. Cl. .................................... 350/302; 350/294
[58] Field of Search ............... 350/302, 294, 293, 299, 350/193

[56] References Cited

U.S. PATENT DOCUMENTS

| | | |
|---|---|---|
| 2,942,522 | 6/1960 | Merriam .................................. 350/302 |
| 3,353,893 | 11/1967 | Bamberger et al. .................. 350/302 |

*Primary Examiner*—Jon W. Henry
*Attorney, Agent, or Firm*—Kinney, Lange, Westman & Fairbairn

[57] ABSTRACT

A rear view mirror for vehicles such as automobiles and trucks, which provides a periscope-like rear view utilizing only two mirror surfaces. One of the mirrors is a substantially planar mirror, and the second of the mirrors is a curved part elliptical mirror. At least one of the mirrors is mounted outside the windshield, and the use of the part elliptical mirror surface provides the proper orientation of the image that is seen by a driver without utilizing prisms, lenses, or three mirror systems. The device is thus much more compact, more attractive in use, and still affords a substantially undistorted wide angle view to the rear.

23 Claims, 13 Drawing Figures

REAR VIEW MIRROR SYSTEM WITH ELLIPTICALLY CURVED MIRROR AND FLAT MIRROR

BACKGROUND OF THE INVENTION

1. Field of the Invention

The present invention relates to rear view mirror systems for vehicles.

2. Prior Art

A wide variety of periscope type or external rear view mirrors have been advanced for use in vehicles. An example is the patent issued to Moultrie, U.S. Pat. No. 3,043,195 which does show a convex lens, a pair of perpendicular exposed front surface lenses, a ground glass screen and a concave viewing mirror. The apparatus is rather complex and involves a large number of optical components.

U.S. Pat. No. 1,905,323 issued to Wallace, shows a rear view attachment that utilizes a conventional planar front mirror adjacent the driver, and a convex mirror mounted at the rear upper corner in the interior of the vehicle so that the driver can get a view of things that are adjacent to the ground immediately to the rear of the vehicle.

Kovach U.S. Pat. No. 2,757,575 shows a prism that has three optical elements for viewing, and it should be noted that prisms of the type shown in Kovach do cause some distortion, are bulky and generally expensive, and further the device requires installation through the roof of the car which requires cutting a hole.

U.S. Pat. No. 3,001,449 issued to Hyde shows an optical system for a rear view mirror arrangement and does show a curved mirror but requires elements having definite focal length lens in the system, as well as a cylindrical mirror which compliments the focal length of the lens, producing one-to-one telescope arrangement.

There are also patents which provide for viewing through the windshield of a car in a rear view mirror system such as Ewing, U.S. Pat. No. 2,346,739.

There are therefore a number of multiple mirror, rear view mirror systems for vehicles, none of which will provide a relatively distortion-free viewing utilizing two elements only, and without relying on lenses or prisms.

SUMMARY OF THE INVENTION

The present invention relates to a rear view mirror system for an automobile or similar vehicle which includes means for providing a wide angle of viewing utilizing two mirrors, both of which may be mounted on the exterior of the automobile, in a compact package that can be made to be attractive and yet will provide a sweep of view to the rear that is not available with ordinary mirrors mounted on the interior of the car.

In driving a conventional automobile, the rear field of view is generally limited in area and dimension by the size of the rear window, as well as by the mirror. If the mirror is small, the view can be restricted more than it is by the rear window.

The rear roof support posts of a vehicle nearly always provide blind areas where the car drivers cannot see approaching vehicles at the rear quarters, and in multiple lane traffic in particular, this is an extremely dangerous situation that cannot be readily corrected by having side exterior mirrors.

In the present invention, a mirror assembly as shown extends laterally and across the entire width of the vehicle and is mounted immediately above the windshield area and includes two mirrors. A first mirror extends transversely of the car and is generally planar, the general plane extending uprightly and the primary mirror that the driver would look into. The second mirror is an elliptically curved mirror positioned above and to the rear of the first mirror and generally overlying a portion of the forward edge of the roof of the vehicle above the windshield.

If two flat mirrors are utilized in this arrangement, the image seen by the driver would be upside down. When the top mirror is formed to have a surface formed into a portion of an ellipse, it properly directs the lines of sight so that not only is a wide angle behind the car viewed, but also the image is righted when a person views it. A slight distortion can occur when the top mirror is a portion of an ellipse with a flat first mirror, but by shaping the first mirror into which the driver looks with a slight curve, negligible distortion is produced as will be explained.

Means are provided to slightly rotate one of the mirrors to compensate for changing eye level. This adjustment can be mounted on the exterior of the car or could be internally adjustable.

The rear and upper edge portion of the elliptical mirror directs the rearward line of sight downwardly toward the ground and thus the vertical extension above the car roof is minimized making a compact, unobtrusive, easily installed and attractive assembly. If desired, the same double mirror assembly can be incorporated in the vehicle body, such as when using a housing formed directly into the roof structure and utilizing one of the mirrors inside the vehicle body adjacent the top headliner area of the vehicle.

With the present device, the rear window is no longer a limiting factor in the field of rear view, and thus safety of operation is enhanced.

The mirror assembly can be accommodated to relatively high production techniques, and thus cost can be minimized so that economy is achieved.

Installation on the roof of the vehicle can be done in any desired manner such as the use of an attaching strip on to the side gutters of an automobile, much like ski racks are now installed, or brackets can be mounted (bolted) directly to the roof to support the mirror structure.

The device utilizes mirrors which reflect light, and they do not have to be designed to permit light to be transmitted therethrough. Transmission through a device is the principal upon which prisms work, contributing to costs, some color distortion, and substantial expense in obtaining good resolution of images.

DESCRIPTION OF THE PREFERRED EMBODIMENTS

Referring first to FIGS. 1 through 9 and the first form of the present invention, the automobile illustrated generally as 10 is of conventional design, and is used merely as an illustration of the type of vehicle on which the rear view mirror system of the present invention illustrated generally as 11 is utilized. As can be seen, the rear view mirror system 11 includes a housing assembly 12 that is mounted adjacent to the windshield 13 of an automobile, and above the roof 14 in a suitable manner. As stated previously, the mounting of the housing 12 on to the roof can be through screws, or by gutter straps 43 such as those which are used for attaching top carriers or ski racks at the present time. A conventional car top carrier support can be utilized on the top of the roof and suitable brackets then can support housing 12.

Figure 1:
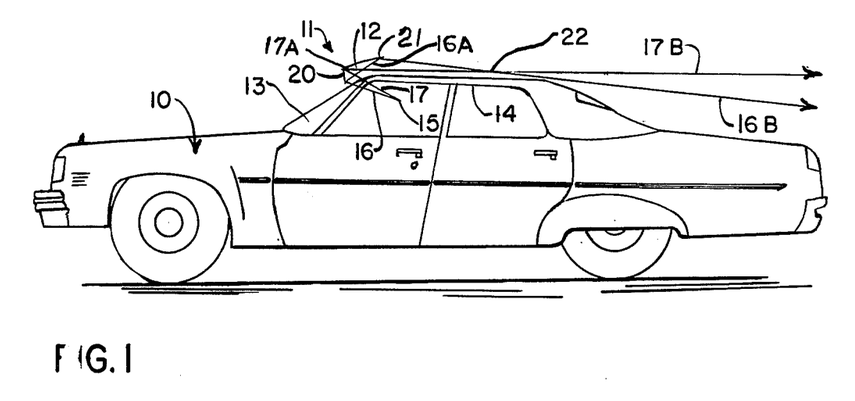
FIG. 1 shows an automobile with a rear view mirror system made in accordance with the present invention installed thereon.

The eye of a viewer (driver) is indicated generally at 15. This is the eye level of the driver of the automobile 10 at the time of driving. This typical location is shown merely for illustrative purposes.

For reference purposes, lines of sight from point 15 may be referred to as lines of sight from the eye, although the viewed image is from light reflected from an observed object. The lines of sight represent reflected light ray paths, and this terminology is also used herein.

In FIG. 1, a lower light ray path at the viewer's eye as 16 is shown, and an upper light ray path 17 is also shown. The lower ray path 16 is reflected from the lower portion of a front mirror indicated generally at 20, and along a path 16A to an upper curved mirror 21. The reflected light follows a path 16B at the rear. The path sections for light ray 17 are shown at 17A and 17B respectively.

Figure 4:
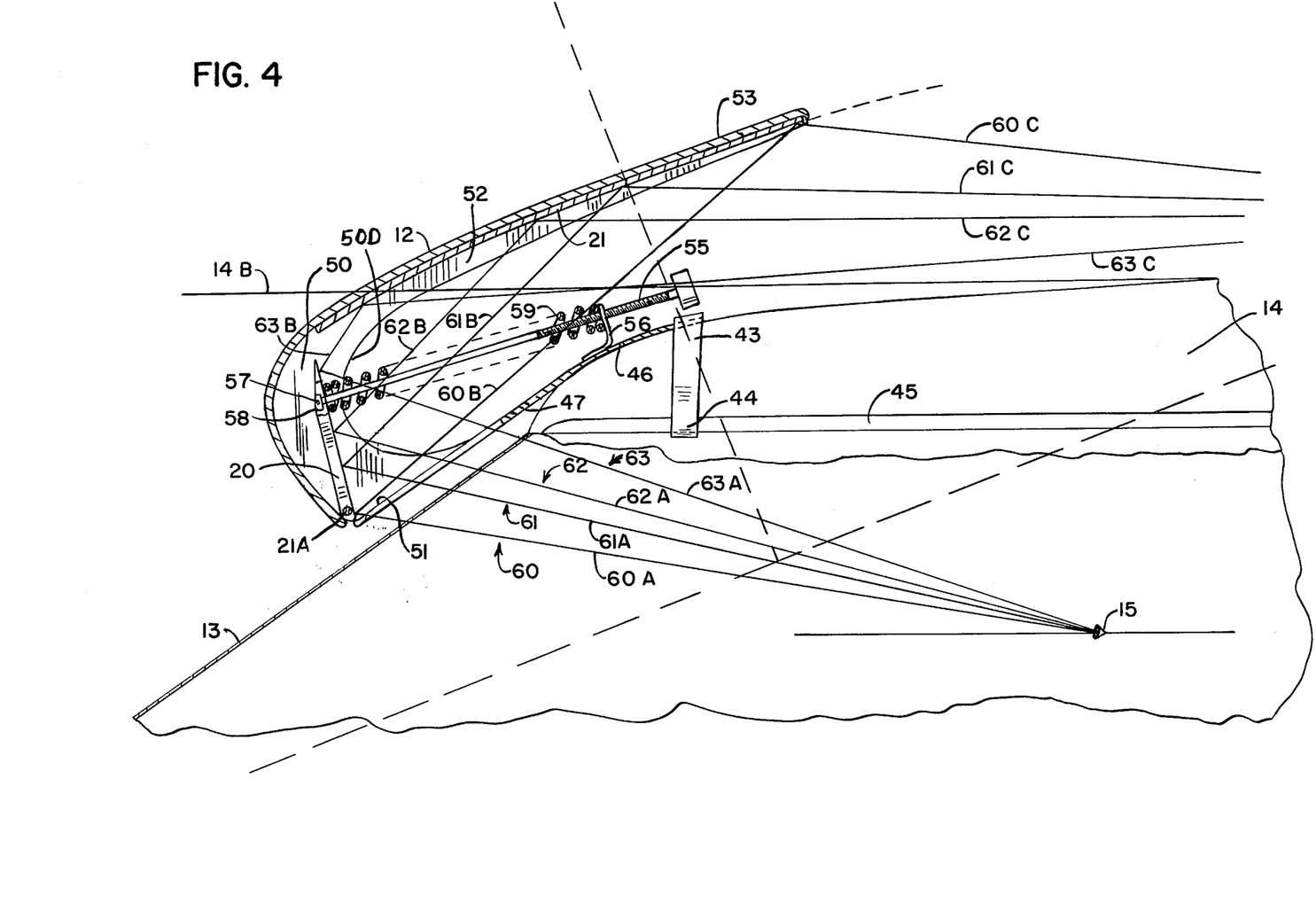
FIG. 4 shows details of mounting and adjustment of the two mirrors, in their relative positions for operation in accordance with the present invention.

Referring specifically to FIG. 4, a detailed view which will be subsequently explained is illustrated, showing in more detail the mirror system of the present invention. The particular light paths that are shown in FIG. 4 will be explained as the description proceeds.

Figure 9:
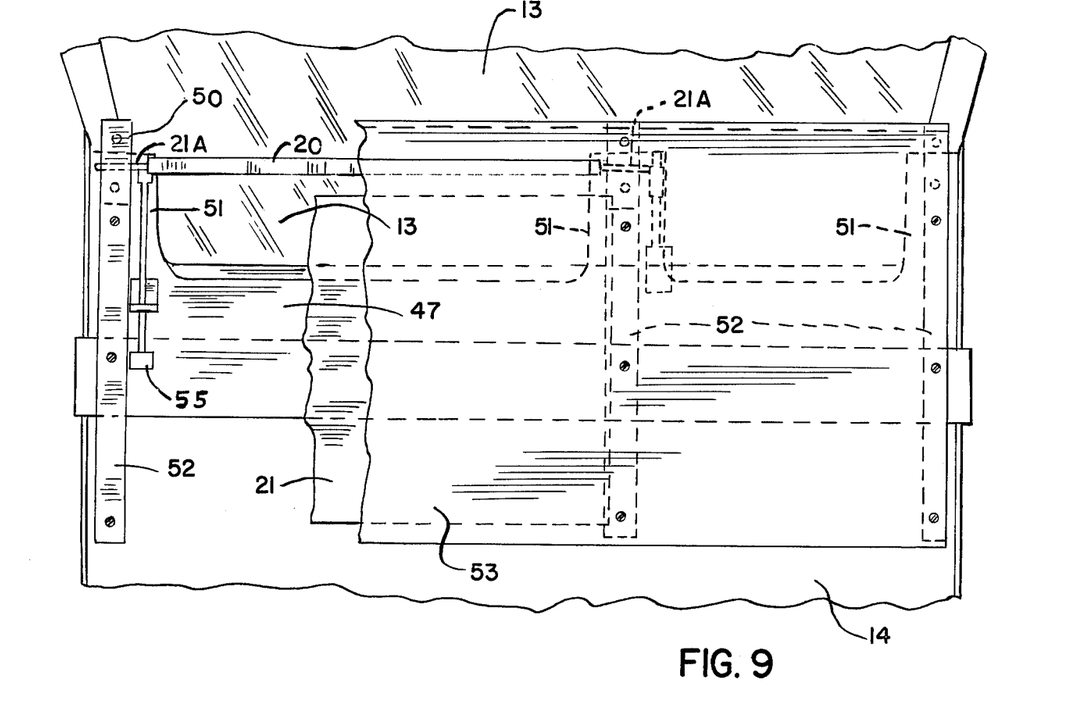
FIG. 9 is a partial top view of the automobile of FIG. 1 adjacent the windshield with parts in section and parts broken away to illustrate other features of the present invention.

Also, as can be seen in FIG. 9, the housing 12 extends generally substantially across the entire width of the automobile roof. The mirror system can be any desired width across the transverse width of the automobile or vehicle.

It can also be seen that if both of the mirrors 20 and 21 were flat the view or image seen by the driver of the automobile would be upside down. To avoid inversion in the disclosed two-mirror system, the reflecting surface of upper mirror 21 is curved in elliptical shape and is concave downwardly. The mirror surface extends along straight lines perpendicular to the drawings in FIG. 4.

Figures 2, 3:
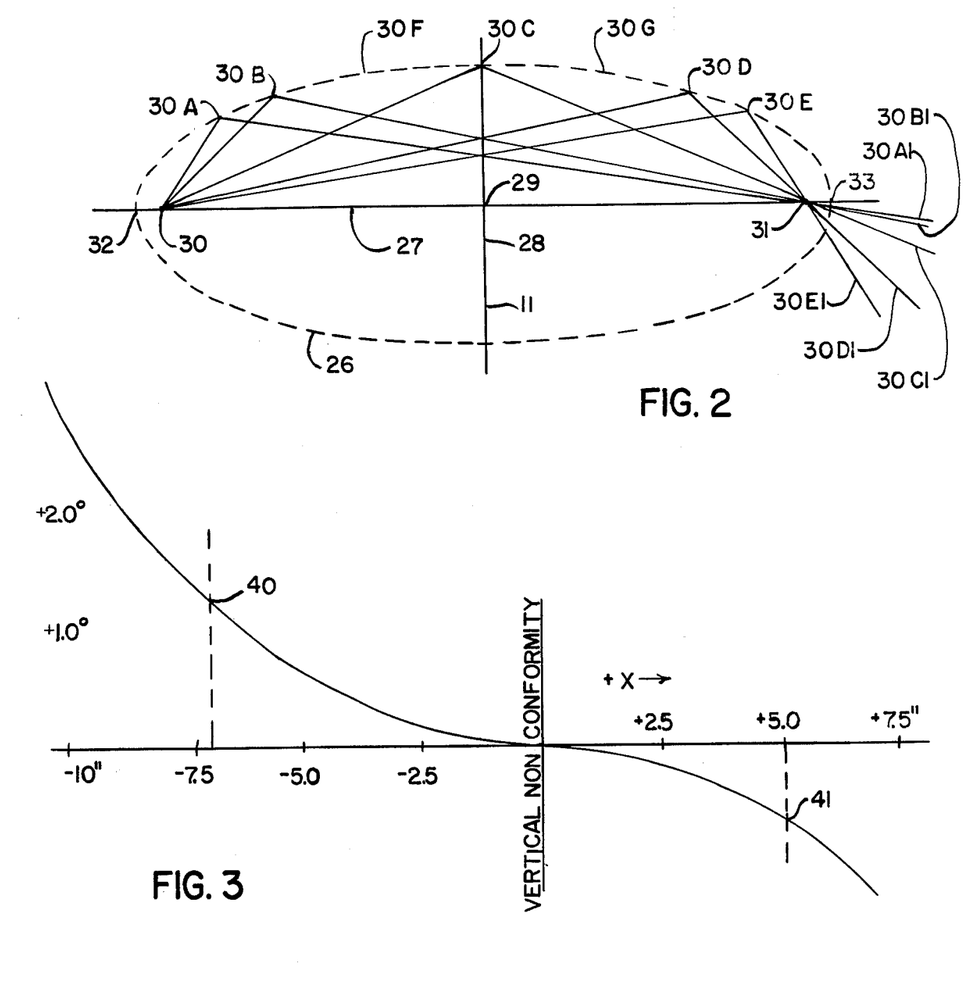
FIG. 2 is a layout of the elliptical form used with the mirror of the present invention illustrating reflected light paths thereon.
FIG. 3 is a plot of a curve showing the vertical distortions that occur from the curved mirror illustrated schematically in FIG. 2.

To illustrate the effects of a generally elliptical or ellipsoidal mirror, FIG. 2 should now be referred to. There, an ellipse 26 is shown in dotted lines and in accordance with geometric principles, the "$a$" axis or the long axis of the ellipse is shown at 27, the "$b$" axis or the transverse central (vertical) axis of the ellipse is shown at 28. Intersection of these two axes is indicated at 29. In accordance with conventional geometric terminology, the "Y" dimension of any point on the ellipse is the vertical distance from axis 27 to a point on the ellipse and the "X" dimension is the horizontal distance from axis 28 to the same point. It is known, of course, that any point of the elliptical curve varies according to the formula:

$$Y = b \sqrt{1 - \frac{X^2}{a^2}} \qquad (1)$$

Where (b) is the vertical distance of the point of the periphery of the ellipse from the axis 27, and (a) is the horizontal distance of such point from axis 28. It is well known that there are two focal points on the "$a$" axis of an ellipse, and these are indicated in the drawing of FIG. 2 at 30 and 31, respectively.

Representative light rays or beams are illustrated on FIG. 2 and are indicating as being reflected from one of the focal points 30, for example, to the focal point 31 from the elliptical surface. For convenience of numbering, the represented points of reflection along the elliptical surface represented at 26 are indicated at 30A, 30B and 30C, (which is the intersection of the ellipse surface 26 and the "Y" axis), and 30D and 30E. It is a property of the ellipse that the sum of the lengths of the two lines 30–30A–31 is the same as the sum of the length of lines 30–30D–31. This holds true for all of the lines shown, in that the distance that a ray of light travels from point 30 to point 31 when reflected from the elliptical surface is the same.

It also is of interest to note that the distance from point 30 to point 30C is the same as the distance from the center 29 to the point 32 where the ellipse intersects the "X" axis. It also is the same as the distance from the center 29 to the opposite end of the ellipse where the ellipse intersects the "X" axis and which is indicated at 33. Thus, again considering that the ellipse is a mirror on the concave inside surface and has a reflecting surface, light rays which travel from point 30 to the inside mirror surface would be reflected and pass through point 31.

Also in order for a light ray passing from one focal point and reflected from the elliptical surface to pass through the other focal point of the ellipse, the slope of the tangent line at the point of reflection (such as 30A, 30B, 30C, 30D or 30F) must correspond to the following equation:

$$\frac{dy}{dx} = \frac{-bX}{a^2(1 - \frac{x^2}{a^2})^{\frac{1}{2}}}$$

Thus where the X distance is negative (to the left of the "b" axis 28) the slope of the tangent line is positive, and if X is positive (to the right of the "b" axis 28) the slope of the tangent line is negative.

It also should be noted that in this discussion, the elliptical mirror surface is formed to have straight lines running perpendicular to the paper, or in the "Z" direction. There would be straight lines on the mirror 21 that is utilized for the upper mirror in the system shown in FIG. 1. It can be considered also that with the vehicle supported on a horizontal plane, horizontal planes would intersect the mirror 21 along straight, horizontal lines parallel to the surface of mirror 20.

The geometrical properties of ellipses are well known, but it is of interest to note that the reflected light ray lines indicated as emanating from point 30 all pass point through 31, and outside the ellipse the rays, which are indicated by lines 30A1, 31B1, 30C1, 30D1 and 30E1 respectively, are inverted on a viewing plane parallel to the Y axis 28 from the rays at point 30. This would mean that the view for an eye positioned at point 30 would be upside down for something that was viewed at the exterior of the ellipse beyond point 31. It can be seen that a half elliptical mirror, which would represent the upper half of the ellipse 27 would not be practical because the point 30 would be far forwardly on the car, and of course, the scene would be upside down as previously described. These conditions can be corrected by utilizing the second mirror 20 which will be more fully described in connection with FIG. 4.

The distortion that arises in elliptical mirrors can be demonstrated by referring to FIG. 2, and it can be seen the distance from 30A to 30B is relatively equal to the distance from 30D to 30E in the form drawn. However, the distance from 30 up to 30A or to 30B is much less than the distance from 30 to 30D or 30E. The angle relative to line 27 defined by a light ray being reflected at point 30A back to point 30 is much greater than the angle relative to line 27 of the light ray being reflected at 30E back to point 30. Thus, an object at the rear which is subtending an angle from point 30A defined by sight lines or rays passing through 30A to point 30 and back to 30B, (which angle is also equal to the angle defined by light rays or lines from 30D to 31 and back to 30E), would appear to be vertically distorted due to the unequal angle of the lines defined by the light ray portions 30A–30–30B and the angle defined by light ray portions 30A–31–30B. If points along the ellipse 26 were chosen close to point 30C, there would be very little vertical distortion and it would not be noticed. However, at the outer ends of the ellipse, where the points just described are considered, the vertical distortions can be more clearly appreciated. Thus, at points 30F, and 30G, for example the distortions would be substantially less, although still present.

In choosing the value of the quantity (a) in equation (1) above to be large with respect to the quantity (b), this vertical distortion area error is greatly reduced. In one preferred embodiment, the distortion is shown graphically in FIG. 3. The lower light ray or beam 16B shown in FIG. 1 was designed to be minus six and one half degrees downward with respect to a horizontal line, while the upper light ray 17B of FIG. 1 is plus three and one half degrees up. Because the mirror system is on the exterior of the car such angles can be selected by the designer. In a conventional system, where the rear window is a factor, the lower ray that is reflected is usually only about 4° down while the upper ray or line of sight is usually about horizontal or, in other words, zero degrees. This difference in operation that is available with the mirror system of the present invention provides an increased field of view which is not blocked by passengers heads, or piled up packages, or restricted by the size of the rear window or the rear view mirror.

In FIG. 3, the values are shown where the quantity (a) for the elliptical mirror is 29.500 inches, and the quantity (b) 11.5266 inches. The quantity which mathematicians call "C", is the distance of the focal points from the center. For example the distance from focal point 30 to the center 29 in the case of FIG. 3, is 27.1549 inches. The resulting angle of a perfectly centered image included by lines drawn from 30C to 30 to 29, and from 30C to 31 to 29 is 23°.

In order to properly locate the elliptical portion of the mirror system with respect to the vehicle, referring to FIGS. 4 and 1, the part elliptical mirror can be rotated counterclockwise (when viewed from the left side of the vehicle or automobile). Most of the objects of interest in a rear view mirror of a vehicle will be below the horizontal line 30. The downward direction of view is generally favored with the mirror of the present invention.

As a matter of choice, it has been determined that the downward ray represented by line 30 to 31, the line of least vertical distortion, should be directed downwardly at between $-1°$ and $-3°$, with $-2°$ being the preferred location. For the preferred $-2°$ location the plane of the ellipse, or the plane represented by line 27 and perpendicular to surface of the drawing paper, should be rotated counterclockwise twenty one degrees so that a ray reflected from 30C through 31 (which is line 30C1) projects downwardly two degrees. This desired mounting position of the part elliptical upper mirror 21 can be achieved by adjusting the mounting brackets in a suitable manner. This angle can be varied from $-1°$ to $-3°$ without major error, but the preferred $-2°$ angle is highly satisfactory in an operating system. With the part elliptical mirror in this position, the distortion in vertical direction is shown in FIG. 3. The vertical line values are in terms of degrees of vertical non-conformity, and the horizontal line represents the major sight line at $-2°$ below horizontal. At a maximum vertical view line of approximately plus three and one half degrees, the distortion is only about 1.5°, which is almost impossible to detect by eye.

The point 40 on FIG. 3 illustrates this error in maximum position and the point 41, which is the maximum negative vertical point at minus six and one half degrees, a vertical distortion is less than (0.7)°. This error is really not visible by the naked eye, and is for all practical purposes impossible to detect.

As stated previously, the transverse or laterally extending lines are straight on the mirror system, and are parallel to the ground when the system is installed on the automobile. There is no distortion from side to side whatsoever. The driver's eyes are spaced along a horizontal line when driving, so all estimates of speed or location are based on horizontal references of angles, and rate of change of such angles. Thus, it is important that there be no horizontal distortion in the mirror system for safe operation. There is none with the device as previously mentioned despite the wide angle of horizontal viewing. The horizontal viewing angle of the present device can be about seventy five degrees without movement of the head, and can be extended ninety degrees by movement of the head slightly. At least 60° of view is preferred.

Details of the mounting and the support system of the mirrors of the present invention are shown specifically in FIG. 4, where the automobile 10 and the windshield 13 are illustrated as partly broken away. The point 15 which represents the eye of the user is illustrated as well. A line 14B represents the horizontal tangent plane of the roof of the automobile. This is the horizontal plane tangent to the car top at the highest point. A support strap illustrated generally at 43 has a gutter hook 44 thereon which slips over the gutter 45 of the car roof and the strap can be tightened down in a desired manner as now is done with ski racks or the like. The strap 43 will support a framework 46 which has a forwardly projecting mounting plate 47 that is attached to the strap 43 in a suitable manner. The mounting plate 47 is rigid enough to support the assembly in a spaced relationship to the windshield 13, as shown in FIG. 4, to permit a windshield wiper to pass beneath the mounting plate 47. Mounting plate 47 has "U" shaped open areas between forwardly projecting support bars 51 to permit a person to look through such open areas to use the mirror system. The forward projecting bars 51 of plate 47 extend down over the windshield 13 sufficiently to support spaced side support arms 50 which are fixed to the mounting plate 47 through the spaced projection bars 51. There are three projections 51, and three arms 50 (as shown). The mirrors 20 and 21 are positioned between the left edge arm 50 and the center arm 50 as shown in FIG. 9.

The arms 50 extend rearwardly, and the rearward extending portions are indicated at 52. Three such arms 50 are used across the width of the vehicle, as shown in FIG. 9. One arm 50 is shown in further detail in FIG. 5, and also in FIG. 6 where it can be seen that the mounting arm rearward extending portion 52 has some thickness to it, and as shown in FIG. 4, the arms support the elliptical mirror 21.

Figures 5, 6:
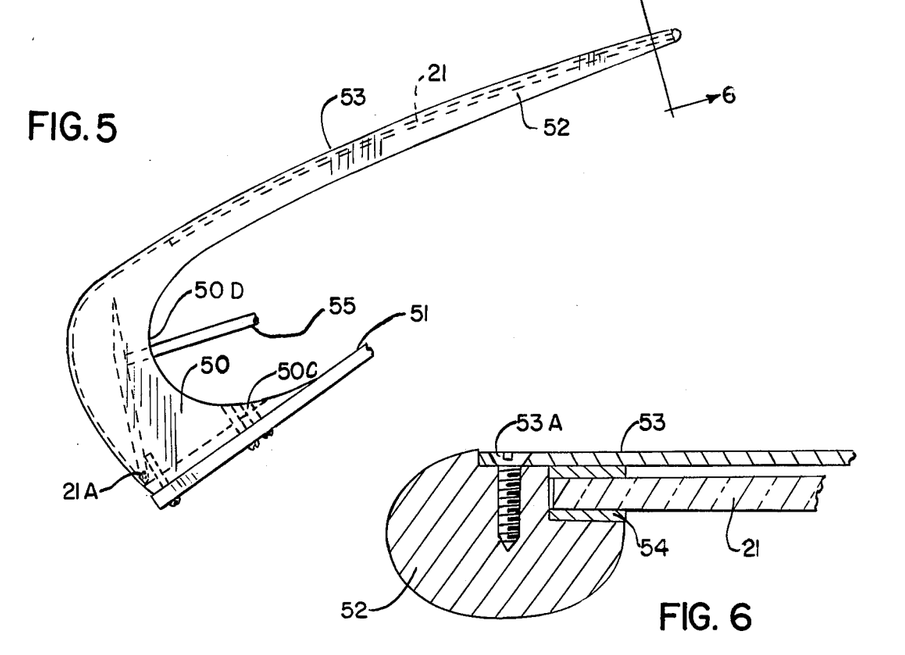
FIG. 5 is a detailed part schematic view of a support and assembly frame utilized with the present invention.
FIG. 6 is a sectional view taken as in line 6—6 in FIG. 5, with parts in section and parts broken away.

The arms 50 also support a cover sheet 53 which shields the mirror system and curves around the front to lessen air resistance. As can be seen in FIG. 6, the mirror 21 can be held under the cover sheet 53 in a groove in the respective arm portions 52 with suitable gaskets 54, and the cover sheet 53 can be attached in place with suitable screws 53A.

The flat forward mirror 20 is also shown in FIGS. 4 and 9 and extends transversely across the automobile. The arm 50 on the near side in FIG. 4 is removed, and a pivot pin indicated generally at 21A is used for mounting the flat mirror on the near, (left) support arm. An identical pivot pin 21A is used on the opposite end of the mirror for supporting the mirror on a second support arm 51, so that the mirror 20 pivots about a horizontal axis. The main portion of the mirror 20 extends upwardly from the pivot pins or shafts.

One type of control of the pivotal position of the mirror 20, which has its reflecting surface facing rearwardly as shown, is schematically illustrated in FIG. 4. A threaded rod 55 is threaded through a suitable support 56, which is fixed on the support on the vehicle and has one end pivotally mounted as at 57 between legs of a bracket illustrated schematically at 58. The bracket 58 is fastened to the forward mirror 20. A spring 59 is used between the bracket 56 and the mirror 20 to urge the mirror 20 forwardly, and so that the mirror does not vibrate due to looseness of the threads of adjusting screw 55. By threading the screw 55 in a desired manner the angular position of the mirror 20 about the horizontal pivot axis can be accommodated.

In FIG. 4, a number of individual light ray illustrations are utilized for exemplifying a pattern of reflection. Light ray 60 is the lowermost reflected ray (or line of sight) from mirror 20, and as shown, includes the section 60A, which extends from the eye 15 up to the lower portion of the lower or front mirror 20; A portion 60B showing the reflected light ray extending between this mirror 20 and the rearwardly and upper edge portion of the part elliptical mirror 21; a portion 60C which corresponds to a line six and one-half degrees below the horizontal. Line 61 is the line of least distortion and includes sections 61A, from the eye to the flat mirror; section 61B from the flat mirror to the upper curved mirror; and a rearwardly directed line section 61C that projects downwardly 2 degrees below the horizontal. Sight line 62 as shown includes line portions 62A, 62B and 62C. Also shown is sight line 63, which includes section 63A, a short section 63B, and section 63C, that is directed upwardly and rearwardly from the curved mirror.

As illustrated in FIG. 4, lines 60 and 63 cross. Line section 63C corresponds to line 17B in FIG. 1, and line section 60C corresponds to line 16B in FIG. 1. The crossing of the sight or reflected ray lines will invert the image at the rear, so that the scene will be viewed correctly by the eye 15. The intersection point illustrated at 22 in FIG. 1 corresponds to point 31 in FIG. 2, and the eye 15 would be in the corresponding location to the point 30 on the ellipse of FIG. 2. The flat mirror 20 reflects the light rays or lines of sight to the desired focal point. The focal point is a simulated location of the focal point 30 back at the eye 15 of the driver. If the eye level 15 is raised or lowered vertically, (because of changing drivers) the mirror 20 can be tilted to change the vertical position of the focal point to accommodate individual drivers and make the mirror system work satisfactorily.

As shown in FIG. 5, in order to adjust the upper mirror relative to the support plate 47, the arm illustrated at 50 which attaches to the members 51, can be attached through suitable cap screws, and the rear of the base portion 50C of the arm 50 can be lifted slightly off support arm 51 through the use of spacers or threaded adjusting screws, to slightly tilt the arm 50 and therefore also tilt the rear tip portion 52 upwardly to thereby adjust the mirror support for different car roof configurations. Once this adjustment has been made, the unit can be securely held with cap screws in its shimmed position, and no further adjustment of the main mounting assembly need be done.

It should also be noted in FIG. 5 that the rear edge 50D of the support arm 50 just above base 50C is curved and cut away for aesthetic purposes, and also to prevent obstruction of light rays coming laterally in from the side. The cut out area further provides an access area for an operator to reach into the assembly and adjust the threaded screw 55 easily and to permit cleaning the mirrors.

Figure 7:
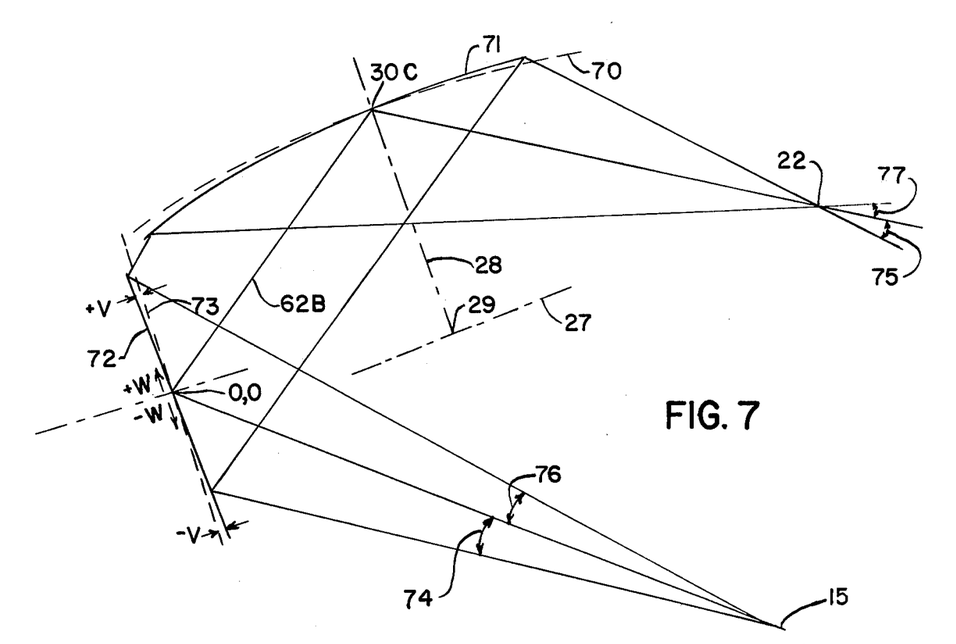
FIG. 7 schematically illustrates how slightly changing the contours of two mirrors of the present invention aid in reducing the distortions illustrated in FIG. 3.

In FIG. 7, a schematic representation of a manner of reducing any distortion is illustrated. The dashed curve 70 is that of a perfect ellipse. The solid curve 71 is a modified ellipse representing the curved mirror shaped to reduce visual distortion. By a slight shaping of the ellipse from the normal position, distortion can be reduced. Also, curving the flat front mirror, which is represented at 73, to a slight curve shown at 72 may be utilized for reducing distortion. In other words, slightly concave and convex reflective surfaces on the front mirror may also be utilized. While the present disclosure deals generally with ellipse shaped upper mirrors, and generally flat front mirrors, slight deviations from exact configurations can be tolerated as long as distortion is minimized, and is not visually objectionable. Actually, slight deviation from a true ellipse for the upper or rear mirror and deviation from a plane for the front mirror aid in reducing distortion.

The front mirror, shaped as at 72, is a slight "S" curve and has both slightly concave and convex surfaces.

The technique used in optics to reduce or eliminate distortion is known as "ray tracing" for multiple optical element design. While the exact equations for correction of distortion will vary for vehicles of different configurations, using an elliptical surface where the distance of line 28 from point 29 to 30C (distance "Y") is 11.5266 inches and the distance from point 29 to point 33 is 29.500 inches (distance "X") (see FIGS. 2 and 7), the equation is:

(3) $Y = 11.5266 - (6.6226 \times 10^{-3}) X^2 - (7.0300 \times 10^{-5}) X^3 - (1.9025 \times 10^{-6}) X^4 - (1.0931 \times 10^{-9}) X^6 - (7.8503 \times 10^{-13}) X^8 - (6.3145 \times 10^{-6}) X^{10} - (5.4420 \times 10^{-19}) X^{12}$.

With this equation, "X" is plus or minus from line 28 and Y is upward from line 27 in FIG. 7, and the vertical distortion diagrammed in FIG. 3 is reduced more than three times, or to about $+0.4°$ and $-0.2°$.

In general form this equation is shown by $Y = A - BX^2 - CX^3 - DX^4$. The coefficients $A, B, C$, etc. are determined by the known ray tracing technique for systems of different X & Y dimensions.

The correction which can be achieved by curving the surface of flat mirror also can be expressed mathmatically. If the line sections 62B, which is the reflected sight line from point 30C to the flat mirror, is used as a base line and the intersection point of line sections 62B and the surface of mirror 20 be considered a 0,0 co-ordinate (0 of a conventional X-Y orthogonal co-ordinate system) and if "+W" is the direction upwardly from this point and "−W" is the direction downwardly, and if "V" is the right-left direction from point 0,0 the equation for slightly curved, corrected mirror surface of mirror 20 is:

$V = (9.4009 \times 10^{-4}) W^3$ (or $V = KW^3$) (4)

(V and W are in inches)

Note that where W is positive the mirror surface is convex and where W is negative the mirror surface is concave. In both mirrors the correction direction reverses as the reflected rays considered move across the intersection point 30C. Line 70 is below line 71 to the right of point 30C and above 71 to the left of this point, for example.

The effects of correction can be combined for the mirrors. That is, the elliptical mirror may be corrected slightly and the flat mirror curved slightly in combination. When this is done, the coeffcents or constants of equations (3) and (4) will be varied from those listed.

The desired feature is to make the angle that is included as shown at 74 equal the angle that is shown at 75, and the angle that is shown at 76 equal the angle that is shown at 77. The point indicated at 22 is the same point as that shown in FIG. 1, and the point 15 is the same as that also in FIG. 1, and represents focal points of the reflected sight lines or reflected rays. The term elliptical is considered to include slight deviations from a true ellipse and "flat" also includes deviations sufficient to compensate for distortion errors as used in this specification and the claims appended.

In FIG. 9 a schematic top view of the mirror system is utilized, and illustrates the desired placement of the adjusting screw 55, so that it can be accessible to the left-hand side of the car roof 14.

Figure 8:
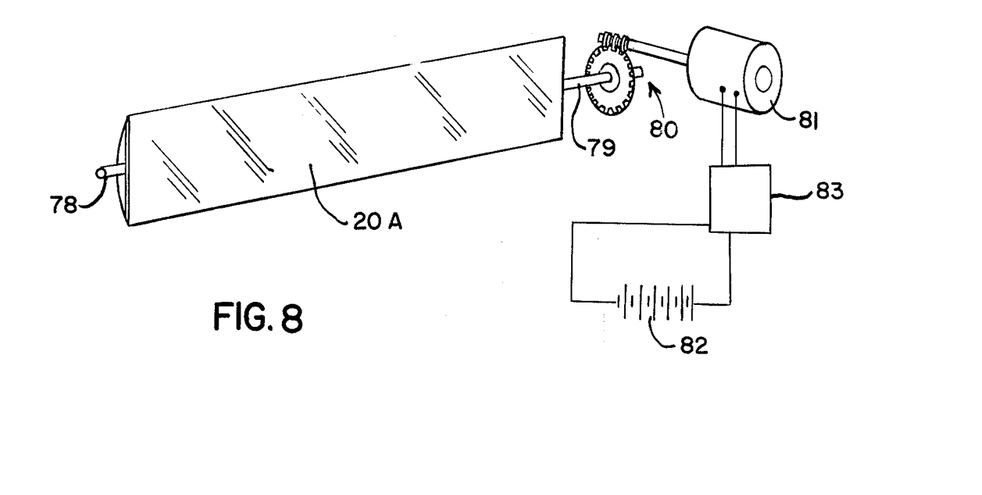
FIG. 8 shows a modified form of the invention wherein adjusting the mirrors is accomplished by using an electric motor to avoid manual adjustment.

FIG. 8 schematically illustrates a motor adjustment for tilting the mirror 20. The illustration in FIG. 8 is merely schematic, and a mirror 20A, which is of a modified form, has support shafts 78 and 79 in the center of the mirror in vertical direction which form a tilt axis in the center of the mirror. These shafts are suitably rotatably mounted with respect to the support bar 47, and the arms 50, and a small worm gear drive assembly illustrated generally at 80 driven from a small DC electric motor 81 can be utilized. The motor 81 is mounted to one side of the mirror, as shown in dotted lines in FIG. 9, and can be controlled from a battery 82 operating through a switch 83 controlled by the operator inside the car. The switch would be a reversing type switch to permit the motor to be reversed and the mirror to be tilted in either direction to accommodate the eye level of different operators.

Figure 10:
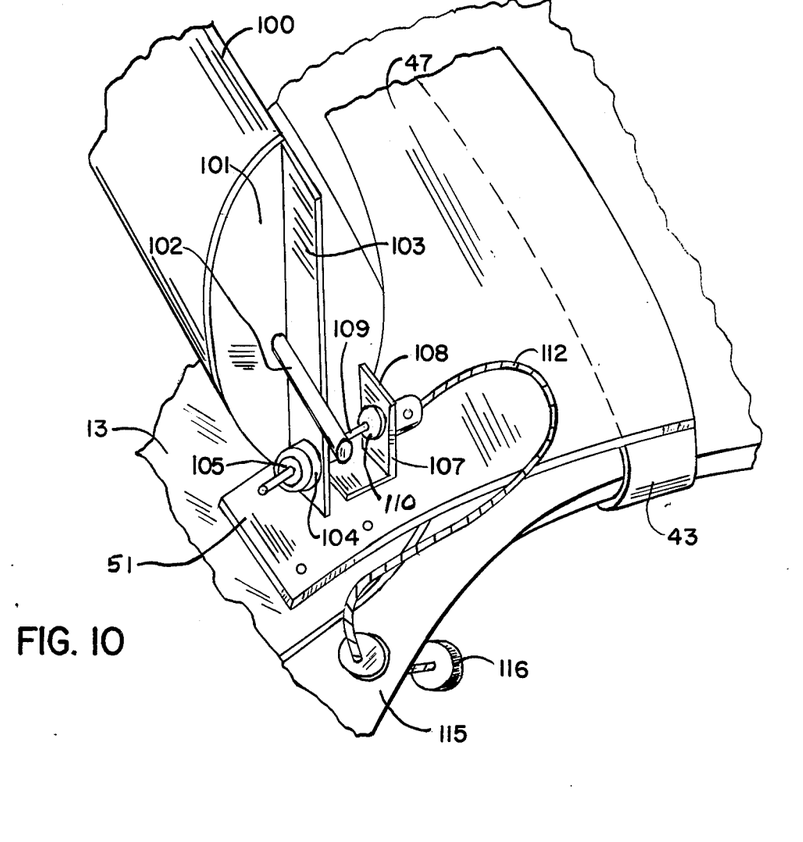
FIG. 10 is a partial perspective view of the front mirror and a modified adjustment device which may be used for adjusting the mirror system of the present invention, with parts broken away.
Figure 11:
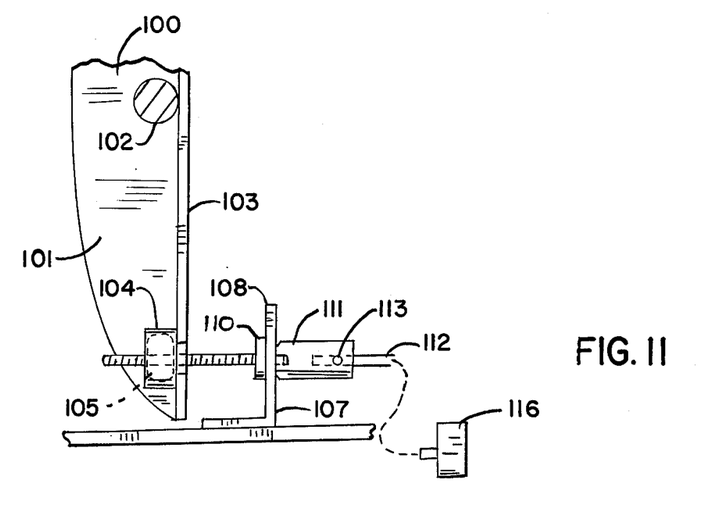
FIG. 11 is a detailed fragmentary side view of portions of the adjustment device of FIG. 10.

In FIGS. 10 and 11, a modified form of the structure utilized for adjusting the inclination of the flat front mirror is illustrated. This adjustment is relatively simple to construct, and permits the operation of the tilt adjustment from the interior of the car merely by using a small flexible cable that is positioned through the left front corner post of the car and has a knob on the interior. Referring to FIGS. 10 and 11 in particular, the cross strap 43 supports the plate 47 which has portions 51 on which arms 50 are attached. Arm 50 on the left side has been broken away for clarity. The elliptically curved upper mirror 21 is in the same position and of the same type as previously explained.

A generally flat surface front mirror indicated at 100 is mounted onto backing or support members 101 at each end, and each of these support members have an end plate that carries a pivot pin 102 that is pivotally mounted in a suitable support arm 50 as in the previous form of the invention. Two support arms 50 are utilized for pivotally mounting the flat front mirror 100, one on each side of the mirror, and thus two pivot pins 102 are also used. The pins 102 as can be seen, are located at the center of the mirror in vertical direction as shown in FIG. 11, and thus the mirror 100 will tilt about a central, generally horizontal axis.

The support bracket 101 also include flanges 103 that extend laterally out from the sides of the mirror, and one of these flanges 103 is utilized on the driver's side for supporting a bearing housing 104 that has a part spherical inner seat. Housing 104 is attached to the flange 103. The interior of the housing houses a nut 105 that has a part spherical outer surface and which is mounted so that it can tilt and swivel throughout a limited angle at least.

One support bar 51 extends from the cross mounting plate 47 adjacent the left gutter of the automobile (on the driver's side), and the support bar 51 extends forwardly so that it comes underneath the mirror 100 as shown. A bracket 107 which has an upright extending leg 108 is mounted on to the support arm 106 and the leg 108 aligns with the flange 103. The leg 108 has an opening therethrough and a screw indicated generally at 109 rotatably extends through the opening in leg 108 and also rotatably extends through an opening in the leg 103 and is threaded into the part spherical nut 105. The screw 109 is held from axial movement relative to leg 108 with a fixed guide washer 110 that is attached to the screw after the screw is in place. A coupling 111 is fixed to the screw on the opposite side of leg 108. This coupling 111 forms the head of the screw and the screw is held from axial movement relative to leg 108 by washer 110 and coupling 111, but is rotatable relative to the leg. The washer 110 is locked on to the screw in a suitable manner, such as with cement, after the screw has been inserted through the opening in the leg 108.

It can be seen that by turning the screw the position of the flat mirror 108 about the axis of the pivot pins 102 can be changed to adjust the inclination of the surfaces of mirror 108 to accommodate different height of drivers and to provide for the adjustment that was previously explained.

The coupling 111 is driven through a flexible cable 112 of suitable design. This can be a cable that is relatively light, such as a choke cable or other rotating control cable of known design. The cable 112 is drivably connected to the coupling 111 through the use of a set screw indicated at 113. The cable itself rotatably passes through an opening in the post or support pillar at the corner of the windshield which is indicated at 115. This opening in the support post can be lined with a suitable plastic or low-friction bushing as shown and also can be sealed against water leaks in a manner which will permit the cable to be rotated. A control knob 116 is positioned therefore in the interior of the car adjacent the upper left corner of the windshield so that a driver of the car can rotate the knob 16, thereby rotating the cable and turning the screw 109 in the part spherical nut 105. The cable is shown schematically, and one may use additional guides, other than the bushing shown in post 115. Cables can transmit rotary motion around corners, and the loops made in the cable are formed large enough to permit such operation.

It should be noted that the part spherical nut can be made in the same manner as part spherical bearings that are presently used in rod ends and, a small rod end can be utilized after the interior is tapped with a thread for receiving the screw 113.

In this manner a simple, mechanical control that is accessible to the operator in the interior of the car can be utilized.

Figure 12:
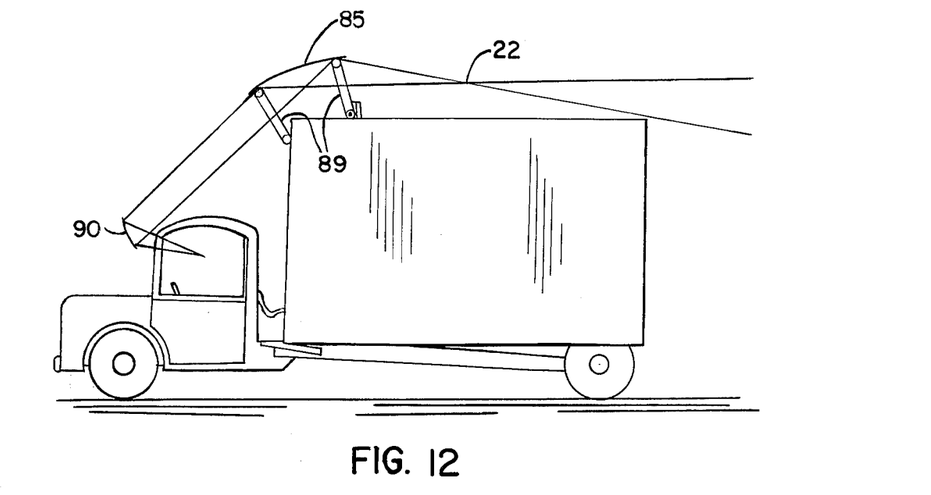
FIG. 12 shows a modified structure in schematic form to accommodate the system of the present invention for use in trucks and vans.
Figure 13:
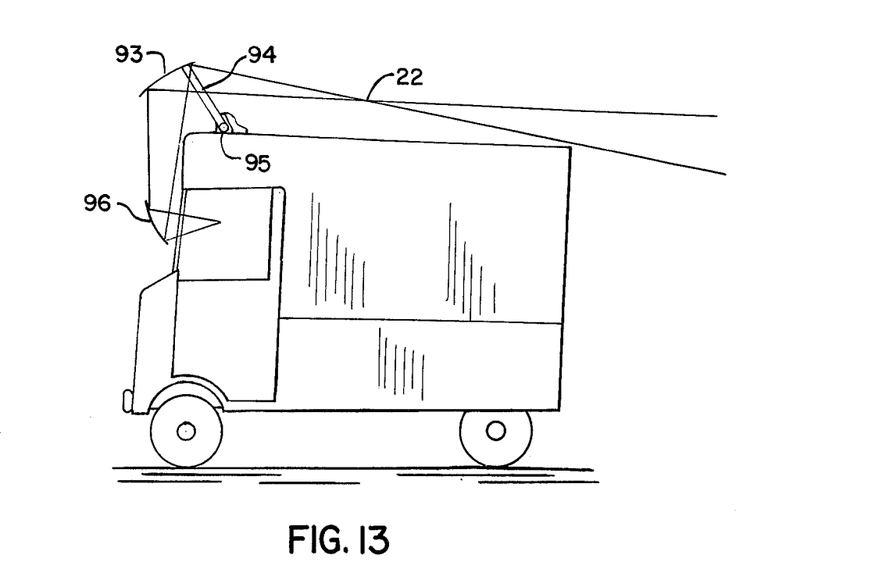
FIG. 13 is a further modified form of the device of FIG. 12 shown part schematic for use with a van.

In FIGS. 12 and 13 two modified forms of the invention are schematically illustrated to indicate that the mirror system of the present invention can be also utilized with trucks. In FIG. 12, the upper mirror indicated at 85 is placed on a parallel arm linkage 89, the pivoting of which can be controlled through suitable mechanical arrangements (not shown). The linkage 89 is mounted to the van body roof. A lower mirror 90 is mounted on the cab of the truck in a manner to be visible to a driver. The mirror 90 can be mounted separately from the elliptical mirror 85. The mirror 85 can be mounted on the linkage 89 so it can be raised and lowered from an operating position to a transport position to lower the mirror 85 to reduce the overall height of the van body of the truck as desired for clearance. The light rays or lines of sight are reflected in the same manner as previously explained and the lines of sight cross at the rear of the mirror 89 as shown. In FIG. 13, the upper mirror 93 is mounted onto a single support arm 94 that can be controlled in a suitable manner for pivoting about a pivot point 95 on a bracket on the top of the van body. The lower mirror 96 as shown schematically is mounted adjacent to the windshield of the van type body. This again is shown only schematically for illustrative purposes, and as shown the sight or the vision lines cross at intersection points indicated at 22 in both FIGS. 12 and 13 to properly orient the image viewed by the driver.

The reflecting surface of lower mirrors 90 and 96 are slightly dished or curved to concentrate the light rays as they are reflected to the respective upper mirrors. Where the two mirrors are separated by a substantial distance as shown in FIGS. 12 and 13 the slightly dished front mirror insures that the rays do not become overly dispersed. Otherwise an extremely large top elliptically shaped mirror would be required.

The mirror system includes a generally elliptical curved mirror which is elliptical in only one plane and which extends transversely along straight lines parallel to horizontal, and a generally flat mirror which is generally parallel to straight horizontal line on the elliptical mirror. The generally flat mirror is in the line of vision of a vehicle driver and the sight lines are reflected rearwardly and upwardly to the generally elliptical mirror from where the lines of sight are reflected rearwardly over the vehicle roof. The sight lines cross rearwardly of the upper mirror so that the rear view image is correctly oriented when observed by a vehicle driver.

Interior sun visors or shades also can be used with the mirror system but must be designed to avoid obstructing the drivers view. Glare reducing shields also can be provided, if desired.

The mounting for the mirrors is shown somewhat schematically. The bars 51 can be narrow support bars attached directly to cross strap 43, if desired and also the upper mirror can be narrowed at the front (tapered from front to back). The wide rear view, of at least 75° included angle is accommodated by having a wide rear edge of the upper mirror, but the front edge does not need to be as wide because the light rays of lines of sight diverge as they reflect from the front mirror.

The narrower front for the upper mirror saves material and can permit streamlining for asthetic purposes or to reduce wind resistance.

In operation it is desirable that the subtended angle between lines 16 and 17 of FIG. 1, which represent the upper line of sight (17) from an eye 15 to the front mirror, next to the top edge of the windshield, and the lower line of sight (16) from the eye to the lower edge of the front mirror, be not substantially greater than 10° to minimize interference with the drivers view. The lower or front mirror is located to provide this viewing angle for the driver.

In FIG. 1, for full rearward view the upward inclination of line 17B can be at least three degrees and the downward inclination of line 16B can be at least 6°, each with respect to a horizontal plane.

What is claimed is:

1. A rear view mirror system for vehicles comprising support means mounted on the exterior of the vehicle above the upper edge of the windshield, said mirror system including a first generally elliptically curved mirror surface mounted by said support means at a location generally above the roof line of the vehicle, said curved mirror surface being curved in fore and aft direction and downwardly concave, and a second substantially flat mirror mounted by said support means below and forwardly of said elliptically curved mirror surface, said second substantially flat mirror being visible by a driver of the vehicle and positioned so that a line of sight reflected from the lower portion of the substantially flat mirror is reflected to an upper and rearwardly positioned portion of the elliptically curved mirror surface, and a line of sight reflected from the upper portion of the substantially flat mirror is reflected to the most forwardly portion of the elliptically curved mirror to provide a properly oriented image for a viewer to the rear and below the substantially flat mirror.

2. The combination as claimed in claim 1 wherein said substantially flat mirror and said generally elliptically curved mirror both extend transversely across the width of the vehicle a substantial distance.

3. The combination of claim 1 wherein the generally elliptically curved mirror has a generally downwardly facing concave reflecting surface which intersects generally horizontal planes along straight generally horizontal lines.

4. The combination as specified in claim 1 and means to pivotally mount the substantially flat mirror to said support means about a generally horizontal axis extending laterally across the vehicle, and means to adjust the pivotal position of said substantially flat mirror about said generally horizontal axis.

5. The combination specified in claim 1 wherein the line of sight of a reflected ray striking the upper portion of the substantially flat mirror reflects against the forward and lower portion of the generally elliptically curved mirror and reflects rearwardly from the generally elliptically curved mirror at a selected angle inclined upwardly with respect to the horizontal.

6. The combination specified in claim 1 wherein a reflected line of sight from the lower portion of said substantially flat mirror strikes the upper and outer end portions of said generally elliptically curved mirror and is reflected from the elliptically curved surface at a downward direction with respect to the horizontal.

7. The combination specified in claim 1 wherein said support means comprises means to mount portions of said mirror system to said vehicle with at least the lower portion of the substantially flat mirror visible through the windshield of the vehicle.

8. The combination specified in claim 4 wherein said means to adjust the pivotal position of said substantially flat mirror comprises threadable means which upon rotation causes tilting of the substantially flat mirror about its generally horizontal axis.

9. The combination of claim 8 wherein said threadable means include a control knob positioned on the exterior of the vehicle accessible to the operator of a vehicle on which the mirror system is mounted.

10. The combination of claim 8 wherein said threadable means includes a control knob on the interior of the vehicle on which the mirror system is mounted and a flexible cable driven from said control knob on the exterior of the vehicle.

11. The combination of claim 4 wherein said means to adjust the pivot position of said substantially flat mirror comprises a rotatable adjustment means and means on the interior of the vehicle on which the mirror system is mounted to operate said rotatable adjustment means.

12. The combination of claim 4 wherein said means to adjust comprises a remotely controlled electric motor.

13. The combination as specified in claim 1 wherein the reflected line of sight from a user of the mirror system on the interior of the vehicle to the upper portion of the substantially flat mirror is reflected from said generally elliptical mirror at the lower and forwardly portion of such generally elliptical mirror and reflected therefrom along a first rearwardly directed line that is inclined upwardly from a horizontal line, and a line of sight reflected from the lower portions of the generally flat mirror reflects from the generally elliptically curved mirror at the upper and rearward end portions thereof and is reflected rearwardly therefrom along a second rearwardly directed line at an angle inclined downwardly from the horizontal.

14. The combination of claim 13 wherein the first rearwardly directed line upwardly inclined at least three degrees from horizontal and said second rearwardly directed line is inclined downwardly at least six degrees from horizontal.

15. The combination of claim 1 wherein the support means mount said first and second mirrors so the reflected line of sight extending to the rear of the vehicle and having the least distortion is substantially between one degree and three degrees below horizontal.

16. A rear view mirror assembly used in combination with a vehicle having a roof, said assembly comprising a first generally planar mirror having a rearwardly facing reflecting surface, mounted in a location to be visible to a driver of the vehicle, and a generally part elliptical concave reflecting surface mirror mounted above and to the rear of said generally flat mirror, said mirrors being mounted relative to each other so that a ray of light reflected onto said generally part elliptical mirror at the upper and rear portions thereof will be reflected to the lower portions of said generally planar mirror and downwardly to the eye of the driver of the vehicle, and a ray of light reflected from the generally forward and lower portions of said generally part elliptical mirror will reflect against the upper portions of said generally planar mirror and be reflected downwardly to a focal point adjacent the normal position of the eye of the driver of the vehicle, said first ray of viewed reflected light being at an angle generally below a horizontal line in direction from the generally part elliptical mirror rearwardly, and said second reflected ray of viewed reflected light being at an angle above the horizontal from the generally part elliptical mirror in a rearward direction.

17. The combination of claim 16 and means to adjust the position of at least one of said mirrors to move the vertical position of said focal point.

18. The combination of claim 16 and means to pivotally mount said generally flat mirror about a transverse generally horizontal pivotal axis relative to the vehicle.

19. The combination of claim 18, and operable means to adjustably position the generally flat mirror about said transverse pivotal axis.

20. The combination of claim 19 wherein said means to adjust comprises a threadable member, a flexible cable connected to said threadable member and means to guide said cable to the interior of the vehicle whereby rotation of said cable from the interior of the vehicle causes rotation of said threadable means.

21. The combination of claim 16 wherein at least one of said mirrors is shaped from a true plane or true part elliptical shape, respectively to reduce vertical distortion of viewed objects.

22. The combination of claim 16 wherein said vehicle has a windshield below the roof, said windshield having an upper edge and said first mirror is positioned to be visible through the windshield by a vehicle operator, said first mirror being positioned so that the line of sight of an operator passing along the upper edge of the windshield and the line of sight of an operator engaging the lower edge of said first mirror forming an angle of not substantially more than 10°.

23. The combination of claim 16 wherein said first and second mirrors are separated by a substantial distance and said first mirror has a concave reflecting surface to prevent excessive dispersion of the lines of sight reflected between the first and second mirrors.

* * * * *